P. DINGER.

TELEGRAPHIC TRANSMITTER.

APPLICATION FILED MAY 17, 1909.

Reissued July 12, 1910. 13,130.

Witnesses:
F. C. Valentine
W. Louis Rose

Inventor:
Paul Dinger,
by Albert Ogden Rossiter
his attorney.

THE NORRIS PETERS CO., WASHINGTON, D.C.

UNITED STATES PATENT OFFICE.

PAUL DINGER, OF CLEVELAND, OHIO, ASSIGNOR OF ONE-HALF TO W. LOUIS ROSE AND ONE-HALF TO ALBERT LYNN LAWRENCE, OF CLEVELAND, OHIO.

TELEGRAPHIC TRANSMITTER.

13,130. Specification of Reissued Letters Patent. Reissued July 12, 1910.

Original No. 920,034, dated April 27, 1909, Serial No. 385,924. Application for reissue filed May 17, 1909. Serial No. 496,679.

*To all whom it may concern:*

Be it known that I, PAUL DINGER, a citizen of the United States, and resident of Cleveland, in the county of Cuyahoga and State of Ohio, have invented certain new and useful Improvements in Telegraphic Transmitters, of which the following is a specification.

My invention relates to improvements in telegraphic instruments technically known as "transmitters" or "sending machines", and the objects of my invention are first, to provide means for regulating the speed of sending the Morse code, which means may be adjusted while the instrument is in use; second, to enable the operator to send the "dots" of the Morse code, either light or heavy, and to thus regulate the instrument simultaneously with its use; third, to provide means for intensifying the dot contact; fourth, to so construct the instrument as to permit its use with the least possible fatigue on the part of the operator; fifth, to design the coöperating parts or members of my improved instrument in a neat, compact and simple manner; and sixth, to provide for all necessary or desirable adjustments thereof. I attain these objects in an instrument constructed and designed substantially as illustrated in the accompanying drawings, wherein:—

Figure 1:
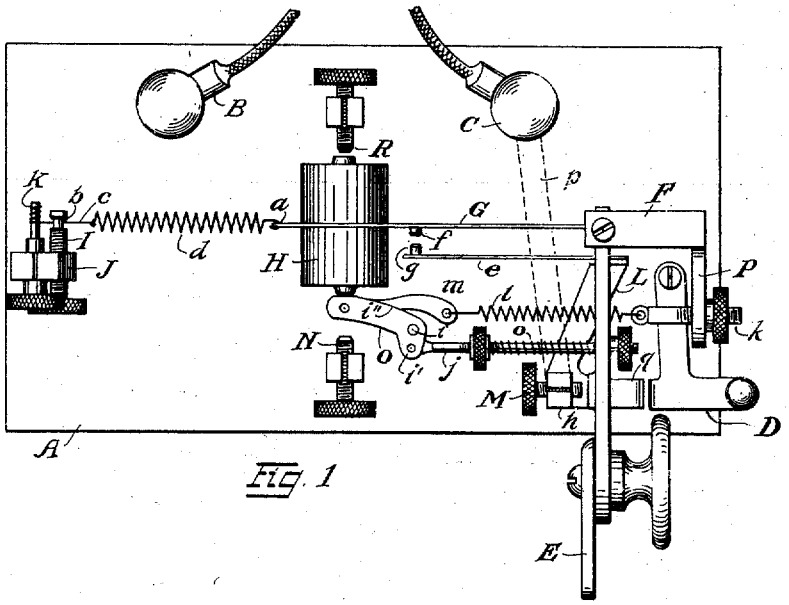
Figure 2:
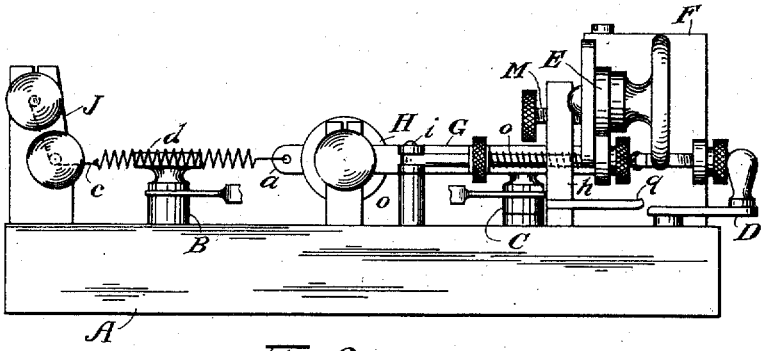

Figure 1 illustrates a plan view of said instrument; and Fig. 2 is a front view in elevation of the same instrument.

Like letters of reference indicate similar parts throughout the drawings and specifications.

My improved telegraphic sending machine comprises a vibrator which is adapted automatically to close circuit intermittently and transmit the dots when released by the key lever, upon moving the latter to the right; which key lever is adapted upon moving it to the left for closing the dash contact manually. The vibrator is provided with a relatively heavy weight operating against the tension of an adjustable spring for varying the speed of transmission, and the direction of pull of the said spring is also adjustable, in order to regulate the sending of the dot contacts and make them light or heavy.

For the purpose of checking the vibrator abruptly and relieving the strain upon the operator, there is mounted adjacent to said vibrator a pivoted bell crank lever, which is so associated with an actuating spring as to exert its maximum effect when the vibrator is brought to rest, and a decreasing force as the bell crank lever is withdrawn therefrom by the key lever. This secures what is known among operators as a light touch for sending messages, although in my improved instrument the vibrator is comparatively heavy for insuring greater regularity in the rapid closure of the dot contacts. Various adjustments for furthering the proper operation of my improved instrument, and more detailed features of construction will be readily understood upon referring to the drawings.

The plan view of my improved instrument illustrates the general arrangement and relation of the parts with the vibrator in a median position of rest, and the co-acting bell crank lever controlling the same in a partially retracted position. In Fig. 1, the base A rearwardly mounts the binding posts B C, which are shown associated with sections of conducting cord adapted for connection with a telegraph line. The usual circuit closing lever D is shown upon the right, and the pivoted key lever E is rearwardly mounted in the bracket F. The vibrator part G is connected to the bracket F, and a weight H is mounted for vibration near the end of part G.

The post J mounts a screw I and a spindle K. The terminal of the former being grooved at *b*, and a cord or string *c* lies within the groove *b*, and is wound around the spindle K. Intermediate of said cord and the perforated terminal *a* of vibrator-part G, is positioned the resilient spring *d* whose tension may be regulated by turning the spindle K, and whose direction of pull is governed by turning the screw I in one direction or the other.

A contact spring *e* is mounted adjacent to the vibrator-part G upon the insulated bracket L, and the contact points *f*, *g* are adapted to be intermittently engaged during the action of the vibrator.

In the post *h* is mounted the contact screw M, which is adapted to be engaged by the lever E, upon moving it to the left, for the purpose of sending the dash impulses. Between the weight H and the adjustable stop N, is positioned the bell crank lever O having its pivotal support at *i*. A rod *j* connects the short arm *i'* with a depending portion of the lever E for the purpose of actuating the bell crank lever away from the weight H of the vibrator. Means are associated with the longer arm *i''* for normally engaging the bell crank lever with said weight. These comprise the curved link *m*, pivoted near the free end of the arm *i''* and connected by means of a retractile spring *l* with the screw-adjusted rod *k*. The link, however, may be omitted upon connecting the spring *l* directly to the lever O. Support P anchors the outer end of rod *k*. Thus, by means of the rod *j*, the lever O can be withdrawn from the path of the vibrator weight H, and by means of the link *m* and its associated parts, the long arm of the lever is caused to bear against the vibrator weight with increasing force engaging it with stop R, as said lever is actuated toward the weight. Since it is apparent, however, that the spring *l* offers diminished resistance as its line of pull approaches the pivot *i* of the bell crank lever O, the operator is enabled to withdraw said member from the weight H by a light touch upon the key lever E, thus adapting the instrument to be operated with little fatigue.

It is found that for the rapid transmission of messages, moreover, the vibrator must be under practically instantaneous control, in order to avoid the sending of "split dots"; caused by the briefest accidental engagement of the contacts just as the key-lever is released. The arrangement set forth secures such prompt control of the vibrator; instantly flexing the member G and engaging weight H with stop R. As the weight is relatively heavy, the bell-crank lever O preferably is quite short, and is pivoted closely adjacent to the weight, so that the action is made prompt and certain.

The key lever is normally held in its neutral position, by means of the spring *l* acting against the rod *j* and the abutting spring *o* adjustably mounted upon the stem of said rod. Thus said lever E may be moved to the left to engage contact M, against the tension of spring *o*, for sending the dash impulses, and may be moved to the right against the tension of spring *l*, to actuate the bell crank lever O and release the vibrator weight H. The vibratory action is thus initiated, and the contact points *f*, *g* are intermittently engaged to transmit distinct dot impulses as required to form the characters of the message.

The binding post C and contact post *h* with its associated parts, are electrically insulated from the base, but are united in circuit by means of the bar *p* underneath the base, as indicated by dotted lines in Fig. 1. The bracket L mounting the spring *e*, is connected with post *h*, as is the arm *q*, beneath which the circuit closer D is adapted to be actuated for cutting the instrument out of circuit.

The speed of vibration and the character of the dot impulses can readily be adjusted by means of the spindle K and the screw I. Upon winding the cord *c* around said spindle K, the spring *d* is placed under tension to increase the activity of the vibrator, and by means of the screw I, the direction of pull of said spring may be varied through the engagement of the groove *b* with said cord. Consequently, the initial distance between the contact points *f* and *g* may be slightly varied, and the period of their momentary engagement may be regulated to produce light or heavy transmission of the dot impulses, although these adjustments are not absolutely essential to a practical sending machine. In fact all the parts as indicated by the drawings are rendered adjustable to insure their proper co-operation and secure the results above mentioned.

What I claim and desire to secure by Letters Patent is:—

1. In a telegraphic transmitter, the combination with a vibrator equipped with a fixed weight, of speed and contact regulating means associated therewith, a bell crank lever, a spring connected thereto under tension in such manner as to exert its maximum force in the direction of the vibrator, and a key lever governing said bell crank lever.

2. In a telegraph transmitter, the combination of a vibrator, a key lever, means under the control of the key lever for imparting to the vibrator the energy required to initiate its vibration and for preventing it from vibrating, means for pulling with a variable and yielding force upon said vibrator in substantially the direction of its length.

3. In a telegraph transmitter, the combination of a vibrator, a key lever, means under the control of the key lever to move and hold the vibrator in a constrained position to one side of its natural position, a contractile coiled spring arranged with its axis in substantial alinement with the vibrator, which spring is attached to one end of the vibrator, and means pulling upon the other end of the spring, substantially in the line of its axis.

4. In a telegraph transmitter, the combination of a vibrator, a key lever, means under the control of the key lever to move and hold the vibrator in a constrained position to one side of its natural position, a contractile coiled spring arranged with its axis in substantial alinement with the vibrator, which spring is attached at one end to the vibrator, means pulling upon the other end of the spring, substantially in the line of its axis, and means whereby the tension of said spring may be varied by varying the force of said pull.

5. In a telegraph transmitter, the combination of a vibrator, a key lever, means under the control of the key lever to move and hold the vibrator in a constrained position to one side of its natural position, a contractile coiled spring arranged with its axis in substantial alinement with the vibrator, which spring is attached at one end to the vibrator, means pulling upon the other end of the spring substantially in the line of its axis, and means whereby the direction of the pull on said spring may be slightly changed.

6. In a telegraph transmitter, the combination of a vibrator in the form of a spring bar fixed at one end, a coil spring secured by one of its ends to the free end of the vibrator, a flexible cord secured to the other end of said spring, and means for taking in and paying out said cord.

7. In a telegraph transmitter, the combination of a vibrator in the form of a spring bar fixed at one end, a coil spring secured by one of its ends to the free end of the vibrator, a flexible cord secured to the other end of said spring, means for taking in and paying out said cord, a grooved device over which said cord passes between its ends, and means for moving said grooved device transversely of said cord.

8. In a telegraphic transmitter, the combination with a vibrator adapted for sending the dot impulses, of a spring-actuated controlling-member therefor exerting its maximum force in the direction of the vibrator and a diminishing force in the opposite direction, and means for momentarily actuating said member away from the vibrator, against the tension of its spring to permit the operation of said vibrator.

9. In a telegraphic transmitter, the combination with a vibrator adapted to transmit the dot impulses, of a pivoted member normally engaging the same, a spring connected thereto in position to insure its decreasing efficiency as the member is actuated away from said vibrator, a lever controlling said member, and means for independently closing the dash contact.

10. In a telegraphic transmitter, the combination with a weighted vibrator adapted automatically to transmit the dot impulses, of a relatively short lever member pivoted adjacent thereto, a spring normally engaging said lever member with the vibrator, a curved part connecting the spring near the free end of the lever member, a key lever for actuating said lever member away from the vibrator and connected thereto in position to insure decreasing efficiency of the spring upon freeing the vibrator, and means for independently closing the dash contact.

11. In a telegraphic transmitter, the combination with a weighted vibrator for transmitting the dot impulses, of a pivoted member, a spring normally engaging it with the vibrator, a key lever for freeing said vibrator, and means for placing tension longitudinally of the vibrator and for slightly varying the direction of such tension or pull.

12. In a telegraphic transmitter, the combination with a weighted vibrator for transmitting the dot impulses, of a controlling-member pivoted closely adjacent to the weight, a spring normally engaging it therewith, and a key-lever connected for actuating said member, substantially as set forth.

13. In a telegraphic transmitter, the combination with a vibrator adapted to transmit the dot impulses, of a short lever-member pivoted closely adjacent thereto, a spring normally engaging it therewith to check vibration, dash-contacts, and a key-lever controlling said member and contacts, substantially as set forth.

PAUL DINGER.

Witnesses:
W. Louis Rose,
Albert Lynn Lawrence.